United States Patent
Shankoff et al.

[15] 3,660,091
[45] May 2, 1972

[54] PASSIVATION OF DICHROMATED GELATIN HOLOGRAMS TO HIGH RELATIVE HUMIDITY AMBIENTS

[72] Inventors: Theodore Arthur Shankoff, Mendham; Constance Veronica Stanionis, Piscataway, both of N.J.

[73] Assignee: Bell Telephone Laboratories, Incorporated, Murray Hill, N.J.

[22] Filed: Apr. 13, 1970

[21] Appl. No.: 28,136

[52] U.S. Cl. .................................. 96/49, 96/27 H, 96/93, 350/3.5
[51] Int. Cl. ........................................ G03c 5/22, G03c 5/04
[58] Field of Search .................. 96/27 H, 49, 93, 75; 350/3.5

[56] References Cited

UNITED STATES PATENTS

| | | | |
|---|---|---|---|
| 3,023,099 | 2/1962 | Yaeger et al. | 96/93 X |
| 2,199,865 | 5/1940 | Wood | 96/93 X |
| 2,675,315 | 4/1954 | Staehle et al. | 96/93 X |
| 3,012,886 | 12/1961 | Lerner | 96/93 X |
| 2,359,040 | 9/1944 | Jorgensen | 96/93 X |
| 2,484,431 | 10/1949 | Staehle et al. | 96/93 X |
| 1,609,091 | 11/1926 | Miller | 96/93 X |
| 2,652,345 | 9/1953 | Jones | 96/114 X |
| 2,716,060 | 8/1955 | Lupo | 96/93 |
| 3,567,444 | 3/1971 | Shankoff | 96/27 H |

OTHER PUBLICATIONS

Lin, L. H., " Aplied Optics," Vol. 8 No. 5, 5/1969, pp. 963–966.
Brandes, R. G. et al., " Applied Optics," Vol. 8 No. 11, 11/1969, pp. 2346–2348.
Kosar, J., " Light–Sensitive Systems," 1965, Wiley & Sons, pp. 46  48, 52–62, 67, 68, 78–80, 82–90.
Shankoff, T. A., " Applied Optics," Vol. 7, No. 10, 10/1968, pp. 2101–2105.

*Primary Examiner*—Charles L. Bowers, Jr.
*Attorney*—R. J. Guenther and Edwin B. Cave

[57] ABSTRACT

A method of passivating dichromated gelatin holograms to high relative humidity ambients is disclosed. The method involves a developing process whereby a dichromated gelatin hologram, which has been exposed to a laser light, is initially treated with a first solvent which both swells and photographically fixes the exposed hologram and also introduces a high relative humidity passivating species into the photographically fixed holographic film. The swollen and fixed hologram is then treated with a second solvent which both removes the first solvent and develops the hologram. A subsequent baking of the developed hologram passivates it to high relative humidity conditions.

3 Claims, No Drawings

3,660,091

PASSIVATION OF DICHROMATED GELATIN HOLOGRAMS TO HIGH RELATIVE HUMIDITY AMBIENTS

BACKGROUND OF THE INVENTION

1. Field of the Invention

This invention relates to a method for the passivation of dichromated gelatin holograms to high relative humidity ambients and more particularly, to the passivation of a hologram in situ during the development of the exposed hologram.

2. Description of the Prior Art

The gelatin-dichromate photosensitive system has been shown to be very efficient as a recording medium in the field of holography. This efficiency stems from the fact that in holography, reconstruction can be from a recording of either varying optical density, or from one of varying refractive index. In the latter case, a hologram can be theoretically 100 percent efficient, that is, be able to diffract all of the reading laser light into the reconstructed image. This refractive index or phase hologram is approximately 20 times more efficient than the absorption hologram recorded on conventional film. Dichromated gelatin phase holograms commonly exceed 90 percent efficiency for the simplest type of hologram, i.e., the plane grating. Efficiencies for other types of holograms are generally 15 to 20 times greater than those in photographic films. Besides being a valuable material in the field of holography, dichromated gelatin has been shown to provide holographic plane gratings of almost theoretical spectroscopic resolving power.

An important limitation on the use of dichromated gelatin as a phase hologram material has been the inability of developed holograms to resist high relative humidity ambients. There is a tendency for the developed hologram to degrade under such conditions in a relatively short time. In this regard, the tendency to degrade increases with increasing film thickness. Attempts to passivate these holograms by overcoating or encapsulating the hologram with polymeric films have not been entirely successful. The polymer encapsulation has been found to be effective only against exposure to liquid water. Owing to the high diffusion coefficients for water vapor through all known polymers, the encapsulation has been only partially successful in the protection of the hologram from water vapor and only under conditions where the polymer film has been relatively thick. The thickness of the polymer film has led to the additional problem of optical distortion. A procedure for the stabilization of developed holograms against high relative humidity conditions has, therefore, long been sought.

SUMMARY OF THE INVENTION

The present invention is directed to a method for the passivation of dichromated gelatin holograms to high relative humidity ambients. The method involves a developing process wherein an exposed hologram is initially treated with an ammonia neutralized photographic fixing solution containing $CrO_3$, the solution being theorized to partially develop the exposed hologram. It is also theorized that an ammonium-linked chromium oxide complex is incorporated in the photographically fixed hologram. The chromium trioxide is thermally activated after the permanent development of the hologram and reacts with the hydrophillic groups responsible for moisture absorption in the gelatin film, thus passivating the recorded holograms to high relative humidities.

DETAILED DESCRIPTION

The present invention is based upon a method of passivating dichromated gelatin holograms to high relative humidity ambients wherein the bulk of the hydrophilic groups on the gelatin molecule are tied up. However, since the mechanism of hologram development requires that these hydrophilic groups be active throughout the development procedure, the method employs a $Cr^{+6}$ ion containing species which does not affect the gelatin during development but is incorporated into the film and activated at a later time as $CrO_3$.

A gelatin-coated glass plate or slide is prepared by applying an aqueous gelatin suspension containing a small amount of $(NH_4)_2 Cr_2O_7$ to the surfaces thereof, employing any standard means such as, for example, spinning, spraying, doctor blading or dipping. The suspension-coated plate is air dried and then baked in an oven to form a hardened gelatin coating. The gelatin-coated glass substrate can then be stored for a period of at least 6 months prior to sensitization.

The gelatin-coated glass plate is subsequently sensitized by dipping the gelatin coat or film into an aqueous solution of $(NH_4)_2 Cr_2O_7$ for several minutes. In this regard, it is to be noted that a small amount of a wetting agent or surfactant may be added to the aqueous $(NH_4)_2 Cr_2O_7$ solution in order to obtain a uniform sensitization or dichromate concentration throughout the entire gelatin film thickness.

After applying the aqueous $(NH_4)_2 Cr_2O_7$, the dichromated gelatin plates are allowed to dry either in darkness or under a red light. Upon drying, the film is stored at a maximum temperature of 20°C in darkness and should be used within 12 hours. The sensitized plates are then exposed to laser light to form holograms or diffraction gratings. It is important to note that the hologram at this stage was formerly treated with a solution which washed out any $Cr^+_6$ ion containing species contained therein and arising from the sensitizer.

A solution to photographically fix the exposed hologram, to swell the gelatin, and to incorporate the $Cr^{+6}$ ion containing species into the photographically fixed hologram is prepared by dissolving an amount of $CrO_3$ in a suitable first solvent which is water. To the first solvent may be added a suitable wetting agent or surfactant to insure uniform swelling and fixation over the entire exposed hologram film surface.

The first solvent is maintained at a temperature in the range of 20°–40° C, and 0.5–5.0 weight percent $CrO_3$ is added to form an acidic solution. $NH_4OH$ is then added to neutralize the resultant acidic solution to pH=7. It is postulated that the ammonia neutralization of the acidic solution containing $CrO_3$ leads to the formation of an ammonium-linked chromium oxide species which is incorporated into the photographically fixed hologram film prior to the permanent development thereof. The neutralization of the acidic solution with $NH_3$ alleviates problems concerning photographic speed and noise in the holographic reconstruction. It can also be hypothesized that the neutralization checks oxidation of gelatin by $CrO_3$ during development and also prevents the acid hydrolysis of gelatin.

The exposed hologram is immersed in the neutral solution, maintained at a temperature in the range of 20°–40° C, for a period of time sufficient to effect the ends designated (1) and (2) above and to (3) incorporate the $Cr^{+6}$ ion containing species, hypothesized as an ammonium-linked chromium oxide species, into the photographically fixed hologram. It is also theorized that the neutral solution partially develops the hologram. A suitable second solvent is then selected which is a nonsolvent for gelatin but which is capable of (1) rapidly dissolving the first solvent, (2) shrinking the swelled photographically fixed hologram to approximately its initial size, and (3) permanently developing the photographically fixed hologram. Suitable second solvents are acetone, methylethyl ketone, ethanol, 2-propanol, dioxane, isopropanol, or mixtures thereof.

A bath of the second solvent is maintained at a temperature ranging from room temperature to the boiling point of the second solvent and the hologram is immersed therein for a period of time sufficient to remove the neutral solution from the surfaces of the fixed hologram, shrink the hologram to approximately its original size and to develop the photographically fixed hologram. The hologram is thereupon removed therefrom, air dried and baked at ca. 150° C for a period of time sufficient to harden the developed film. During this heat treatment of the hologram it is hypothesized that there is an evolution of $NH_3$ gas resulting in the reformation of $CrO_3$, which species passivates the developed hologram to high relative humidity ambients.

The hologram resulting from the above-described treatment is now passivated or stabilized to high relative humidity conditions. The stability level is taken as that relative humidity in which plane gratings with $0.5\mu$ $d$-spacings show no loss in diffraction efficiency after a 72-hour exposure. If desired, in order to protect the hologram from liquid water, a thin coating of a suitable polymeric material may be applied to the stabilized hologram. A suitable polymer may be selected from vinyl polymers such alkyd resins, acrylic polymers, methacrylic polymers, polyvinyl chlorides or polyvinylidene chloride. However, it is to be noted that the thickness of this film should be kept to a minimum to avoid any possibility of optical distortion.

A further understanding of the method of this invention will be obtained from the following specific examples which are illustrative of the invention and are not restrictive thereof.

EXAMPLE 1

A sufficient amount of commercially available USP grade gelatin having a bloom strength of 125 was weighed out and added to water to form a 16 percent by weight aqueous gelatin suspension at 40° C. In this regard, bloom strength equals the weight required to force a standardized cylindrical plummet 4 mm into the surface of a gelatin gel made of 6.67 percent aqueous gelatin which is maintained at 10° C for 17 hours. To this suspension was added $(NH_4)_2 Cr_2O_7$ which was of the highest purity commercially available. The amount of $(NH_4)_2 Cr_2O_7$ added was sufficient to give a weight ratio of 0.5 percent to the weight of gelatin.

A $5 \times 5 \times 0.058$ in. to 0.068 in. glass plate, commercially obtained having an index of refraction of 1.523 and a window glass finish, was dipped into the resultant dichromate-gelatin suspension employing a commercial dip-coating apparatus. The plate was withdrawn from the suspension after a time period sufficient to form a $3\mu$ thick dichromate-gelatin coated plate, after subsequent drying and baking operations. The dichromate-gelatin coated plate was then set in a vertical position to air dry for 1 hour. The dichromate-gelatin film-coated plate was then hardened in an oven at 150° C for 2 hours. The $3\mu$ thick hardened film-coated plate was then sensitized by being dipped vertically in a 4.0 percent aqueous $(NH_4)_2 Cr_2O_7$ bath maintained at 40° C and containing 20,000 parts by weight of a wetting agent. After 2 minutes the sensitized plate was removed and vertically dried in the dark.

The dried sensitized plate was exposed to 5 $mjCm^{-2}$ of 4880 A. laser light to form a gelatin hologram. The exposed plate or hologram was then immersed in a fixing bath neutralized with $NH_4OH$ to a pH=7 and maintained at 25° C. The fixing bath contained a first solvent of water and 0.005 percent by weight of a commercially available surfactant. To the first solvent was added 0.5 percent by weight $CrO_3$, of the highest purity commercially available, to form an acidic solution. $NH_4OH$ was immediately thereafter added to neutralize the acidic solution to a pH equal to 7.

After 1 minute the photographically fixed hologram was removed from the neutralized fixing solution and immersed in a bath maintained at 70° C and containing a second solvent of isopropanol. The fixed hologram was kept in the isopropanol for 30 seconds in order to remove the first liquid and to shrink and develop the hologram. The developed plate was then removed from the bath, air dried in a stream of dry air, and finally baked at 150° C for 2 hours in an oven. The resultant hologram was stable up to a relative humidity of 73 percent at 25° C.

EXAMPLE 2

The procedure of Example 1 was repeated with the exception that 1.0 percent, by weight, $CrO_3$ was added to the first solvent. The resultant hologram was stable up to a relative humidity of 84 percent at 25° C.

EXAMPLE 3

The procedure of Example 1 was repeated with the exception that 2.0 percent, by weight, $CrO_3$ was added to the first solvent. The resultant hologram was stable up to a relative humidity of 93 percent at 25° C.

EXAMPLE 4

The procedure of Example 1 was repeated with the exception that 5.0 percent, by weight, $CrO_3$ was added to the first solvent. The resultant hologram was stable above a relative humidity of 95 percent at 25° C.

EXAMPLE 5

The procedure of Example 1 was repeated with the exception that a $10\mu$ thick dichromate-gelatin coated plate was formed. The resultant hologram was stable up to a relative humidity of 73 percent at 25° C.

EXAMPLE 6

The procedure of Example 5 was repeated with the exception that 1.0 percent, by weight, $CrO_3$ was added to the first solvent. The resultant hologram was stable up to a relative humidity of 84 percent at 25° C.

What is claimed is:

1. A method of passivating an exposed material to high relative humidity ambients, said exposed material having a dichromated gelatin coating comprising gelatin and a dichromate compound and upon development forms a phase hologram in the exposed material, said method comprises:
    a. immersing the exposed material in an $NH_4OH$ neutralized first solvent solution having a pH of 7 comprising water having $CrO_3$ dissolved therein, thereby photographically fixing the exposed material;
    b. removing the material from said first solution and immersing it in a second solvent, thereby developing the photographically fixed material, said second solvent being selected from the group consisting of acetone, methylethylketone, ethanol, 2-propanol, dioxane, polyglycol ethers, isopropanol and mixtures thereof;
    c. removing the hologram from said second solvent and heating it at a temperature of 150° C thereby resulting in a high relative humidity resistant developed hologram.

2. The method as defined in claim 1 wherein said dissolved $CrO_3$ is present in an amount within the range 0.5 to 5 percent by weight of $CrO_3$.

3. The method as defined in claim 1 wherein said first solution is maintained at a temperature in the range of 25°–40° C.

* * * * *